US012562665B2

(12) United States Patent
Popov et al.

(10) Patent No.: US 12,562,665 B2
(45) Date of Patent: Feb. 24, 2026

(54) SYSTEM AND METHOD FOR MOTOR CONTROL THROUGH IMPROVED LOCATION MEASUREMENT

(71) Applicant: Insight Automation, Inc., Erlanger, KY (US)

(72) Inventors: Emil V. Popov, Independence, KY (US); Ivaylo N. Sotirov, Mason, OH (US)

(73) Assignee: Insight Automation, Inc., Erlanger, KY (US)

( * ) Notice: Subject to any disclaimer, the term of this patent is extended or adjusted under 35 U.S.C. 154(b) by 267 days.

(21) Appl. No.: 18/529,641

(22) Filed: Dec. 5, 2023

(65) Prior Publication Data

US 2024/0106363 A1 Mar. 28, 2024

Related U.S. Application Data

(63) Continuation of application No. 17/673,425, filed on Feb. 16, 2022, now Pat. No. 11,855,561.

(60) Provisional application No. 63/149,907, filed on Feb. 16, 2021.

(51) Int. Cl.
| | |
|---|---|
| *H02P 1/04* | (2006.01) |
| *H02P 23/14* | (2006.01) |
| *H02P 27/06* | (2006.01) |

(52) U.S. Cl.
CPC .............. *H02P 23/14* (2013.01); *H02P 27/06* (2013.01)

(58) Field of Classification Search
CPC .. H02P 1/04; H02P 23/14; H02P 27/06; G01P 3/487
See application file for complete search history.

(56) References Cited

U.S. PATENT DOCUMENTS

| | | | |
|---|---|---|---|
| 11,855,561 B2 | 12/2023 | Popov et al. | |
| 2013/0300324 A1* | 11/2013 | Kaufmann | G01P 3/487 318/400.04 |
| 2019/0003856 A1 | 1/2019 | Kawakami et al. | |
| 2019/0319560 A1* | 10/2019 | Shi | H02P 1/04 |

OTHER PUBLICATIONS

European Patent Office; Search Report and Written Opinion in related International Patent Application No. PCT/US2022/016629 dated May 10, 2022 ; 12 pages.
Ni et al.; IEEE Transactions on Industry Applications; Article entitled "A New Position and Spped Estimation Scheme for Position Control of PMSM Drives Using Low-Resolution Position Sensors."

(Continued)

*Primary Examiner* — Cortez M Cook
(74) *Attorney, Agent, or Firm* — Wood Herron & Evans LLP

(57) ABSTRACT

A motor control determines if a motor is rotating at steady state velocity and then populates a table with information about each individual motor sector. At steady state velocity, the duration of the motor within an electrical sector is measured. The duration of the complete mechanical rotation of the motor is determined. The controller determines a ratio of the measured duration of the sector to a duration of a complete mechanical rotation of the motor. The ratio of sector duration to rotation duration is stored in a table. The controller is configured for controlling the motor using the table values.

18 Claims, 11 Drawing Sheets

(56)     References Cited

OTHER PUBLICATIONS

Kim et al.; IEEE Transactions on Industrial Electronics vol. 58, No. 9 dated Sep. 2011; Article entitled "An Improved Rotor Position Estimation With Vestor-Tracking Observer in PMSM Drives With Low-Resolution Hall-Effect Sensors."

Park et al.; The Korean Institute of Electrical Engineers; J Electr Technol 2016 Article entitled "Compensation Method of Position Signal Error with Misaligned Hall-Effect Sensors of BLDC Motor."

Liu et al.; IEEE Sensors Journal, vol. 19, No. 6, Mar. 15, 2019; Article entitled "High-Precision Speed and Position estimation Based on Hall Vector Frequency Tracking for PMSM with Bipolar Hall-Effect Sensors."

Colton; Design Notes; 3ph Duo: 2×1kW Brushless Motor Controller with Field-Oriented Control dated Jan. 12, 2010.

* cited by examiner

SECTOR DURATION RELATIVE TO MECHANICAL REVOLUTION DURATION vs SECTOR NUMBER

ACTUAL    ---- IDEAL (1 / (SCE * PP)) = 0.3333

SYSTEM AND METHOD FOR MOTOR CONTROL THROUGH IMPROVED LOCATION MEASUREMENT

CROSS-REFERENCE TO RELATED APPLICATIONS

This application claims the benefit of priority to U.S. Provisional Patent Application Ser. No. 63/149,907 filed Feb. 16, 2021, the disclosure of which is incorporated by reference herein.

FIELD OF THE INVENTION

The invention is directed generally to the control of motors and specifically to the precise control of motors, such as DC motors and multi-phase motors.

BACKGROUND OF THE INVENTION

In the area of motor control, and particularly precise motor control, such as for DC and multi-phase motors, it is critical for the motor driver circuitry to be able to know the position of the rotor element of the motor for providing the drive currents to measure the current passing through the coils of the motor. There are various different solutions available that might be utilized for such measurements and controls, but each has various drawbacks and costs.

More specifically permanent magnet synchronous motors can be controlled only if the position of the rotor is known as it travels in rotation. The control circuitry and motor driver circuitry needs to have the position information in order to properly energize the correct coils in sequence to make the motor produce torque in an efficient manner. The angle of the rotor in its cycle can be measured directly, or the angular position can be deduced using various different schemes and algorithms. There are variety of control methods, that may be sensorless or sensored methods. Some of the more prevalent sensorless control methods being using BEMF zero crossing detection on the unused motor phase, or using an observer that predicts the rotor position based on voltages and currents measured on the motor phases. Sensored methods might include using Hall-effect sensor feedback, for example. Other sensored methods use absolute or incremental encoder feedback or use a resolver feedback.

Sensored methods using Hall-effect sensors are widely used methods that provide a good compromise between accuracy of the rotor angle and price of the implementation. Using Hall-effect sensors involves more hardware and wiring compared to other sensorless control strategies. But such sensored methods have the benefit of allowing maximum torque at zero speed, while sensorless techniques struggle in that regard. Generally, in methods using Hall-effect sensors, the sensors are placed in the motor in such a way that one sensor signal goes through a high and low period for every electrical cycle of the motor. The number of pole pairs of the motor will govern how many of these electrical cycles and Hall-effect sensor measurements must be completed to equal one mechanical revolution of the rotor.

In a typical motor arrangement, there are usually 3 Hall-effect sensors placed at 120 electrical degrees around the rotor or stator thereby providing he rotor position feedback signals. In most cases, these 3 signals and their specific values in the motor rotation are interpreted as bits and for the combination, the bits are combined and interpreted as a number, that is referred to as a sector. When dealing with motors that use 120 degree sensor placement, a sector will represent 60 degrees of the electrical cycle. Since each pole pair of a motor will have a number of sectors associated therewith, the total number of sectors that reflect an entire mechanical rotation of the motor will vary.

Accordingly, the present invention is directed to evaluation of the information of the motor operation for the various sectors associated with the rotation and using the information for providing desirable angular position and speed information for better, more efficient and cost effective dynamic control of a DC or multi-phase motor, such as brushless DC motor (BLDC) or a permanent magnet synchronous motor (PMSM).

SUMMARY OF THE INVENTION

Control circuitry for controlling a motor including a rotor, a stator and a plurality of sensors positioned in the motor, such as Hall-effect sensors is described. The sensors define a plurality of electrical sectors of the motor through which the motor will rotate. The controller is configured for determining if the motor is rotating at a steady state velocity. If it is, the sensors of the motor are used for measuring the duration that the motor spends rotating within each of the plurality of electrical sectors. Using a plurality of the measured durations within electrical sectors, the duration of a complete mechanical rotation of the motor through all of the electrical sectors is determined. Then a value that is a ratio of the measured duration of the motor in a particular sector to the duration of the complete mechanical rotation of the motor is determined and stored in a table. The table values are used for determining sector durations and angles for each sector and the information is used for controlling the motor.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

Figure 1:
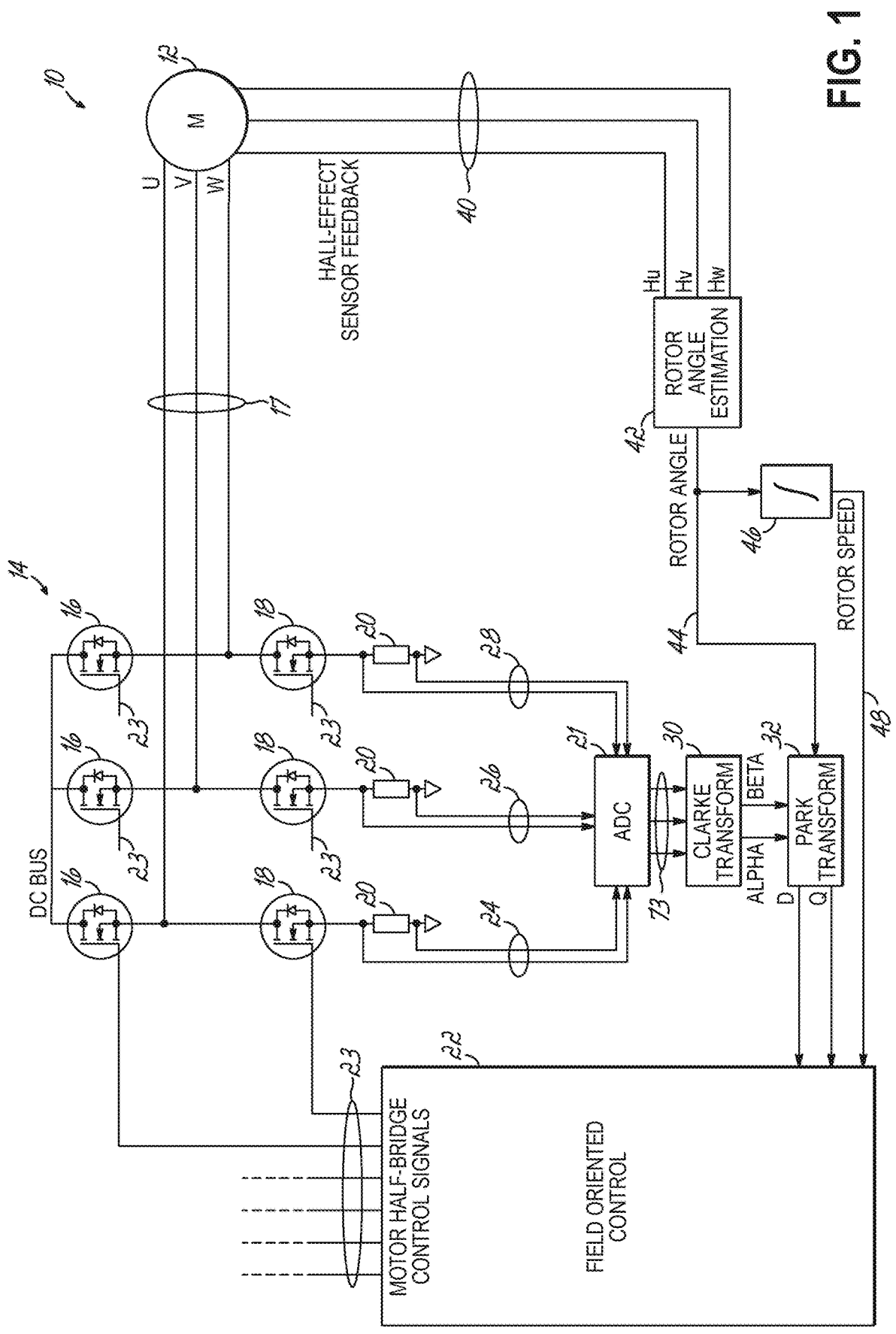
FIG. 1 is a circuit diagram of a motor control circuit system in accordance with an embodiment of the invention that provides an evaluation of sector durations for use in the control scheme.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF EMBODIMENTS
OF THE INVENTION

The present invention provides a motor controller and control process that can identify and correct for Hall-effect placement or positional errors and/or rotor magnetic pole errors in an arbitrary non-ideal motor without having prior knowledge of these errors. The present invention provides an ongoing determination of the sector conditions of the motor and can make adjustments for variations that may occur over time associated with such Hall-effect placement or positional errors and/or rotor magnetic pole errors.

The present invention maintains sector information in the form of duration ratios of a particular sector versus the overall duration of a mechanical rotation of the motor. The controller then uses the determined sector durations and the stored ratios reflective of the sectors to measure the instantaneous motor speed with great accuracy at every Hall-effect sensor transition without having to average out many consecutive readings.

Still further, using the knowledge of the accurate instantaneous speed and the compensated sector duration table values, the controller of the invention accurately predicts how the rotor angle will change in time until the next Hall-effect sensor transition associated with a particular pole in the motor. In that way, because of the accurate prediction of the rotor angle, the controller can maintain a more proper angle between the rotor and stator magnetic flux vectors and thereby minimize the torque ripple and audible noise and also maximize efficiency in torque production. To that end, the present invention can be used for more advanced commutation techniques like space-vector modulation, even when the feedback does not provide the accuracy that is usually required for such commutation techniques.

In various of the examples as discussed herein, a motor having 3 Hall-effect sensors placed at 120 electrical degrees will be used for providing the rotor position feedback signals. As noted, in most cases, these 3 signals get interpreted as bits and after combining them, get interpreted as a number, called a sector. When dealing with 120 degree sensor placement, a sector represents 60 degrees of the electrical cycle. The invention and methodology as described herein, however, applies to any combination or numbers of Hall-effect sensors, and pole pairs and angular sensor placement in the motor. For the discussed examples and embodiments herein, the present application uses examples having 3 Hall-effect sensors placed at 120 electrical degrees around the motor, since such an arrangement is a widely used arrangement in current motor control.

FIG. 1 illustrates one version of a typical motor control system 10 for control of a motor through Hall-effect sensor measurements implementing the present invention. The system 10 includes a number of interconnected circuits for controlling the operation of the motor 12 and specifically uses a motor drive circuit 14 that receives control signals 23 from a motor control circuit or controller 22. The motor can be an appropriate multi-phase motor, such as, for example brushless DC motors (BLDC) or permanent magnet synchronous motors (PMSM) or AC asynchronous motors or Reluctance motors, to name a few. The motor drive circuit 14 in one exemplary embodiment is in the form of a half-bridge circuit that incorporates transistors 16 in an upper half of the drive circuit 14 and transistors 18 in a lower half of the drive circuit that are selectively powered to conduct in cycles for the creation of current drive signals 17 for the various motor coils for proper commutation of the motor. Generally, in the operation of the illustrated drive circuit 14, it might be controlled through pulse width modulation (PWM) control signals 23 sent to the various transistors 16, 18 to provide the desired U, V, W phase current drive signals 17 to motor 12. For the measurement of the angular position of the motor 12, Hall-effect sensors may be used in the motor, as reflected by the sensor signals 40. For the necessary control and proper commutation of the motor, the invention uses the measured signals to determine the specific construction and operation of the particular motor and its Hall-effect sensor, in order to provide a more precise and efficient motor control based on the rotor angle of the rotor element of the motor.

For the measurement of current levels in the various coils of the motor 12, different currents might be measured that are reflective of or associated with the level of current directed to the individual coils. For example, the motor drive circuit 14 might use low side or ground side shunt resistors 20 that are connected with the output of the lower half transistors 18 to ground. The transistors 16 and 18 are controlled by the motor control circuit or controller 22, such as a field oriented control circuit. The controller 22 receives a number of inputs that reflect conditions of the motor operation, such as the measurements of the coil current from the shunt resistors 20, as transformed for control purposes, and other inputs as described herein, such as the angular span of the various sectors in the motor as well as the rotor speed 48 of the motor 12 or the rotor angle 44. The controller 22 includes one or more processor elements that process the various inputs and generates outputs, such as control signals 23 for operating the drive circuit 14 and the various transistors 16, 18 in accordance with one exemplary embodiment of the invention. The processer also includes various memory elements or memory for forming and storing tables of sector ratios as discussed herein. The controller 22 executes the control and measurement steps for determining the various sector ratios of the invention and storing and accessing them.

More specifically, as illustrated in FIG. 1, the current of the drive signals 17 to the motor coils is measured by measuring an effective current in each branch containing the lower half transistors 18 that provide the drive signals 17. The measured current values 24, 26, 28 are reflective of the current drive signals 17 being directed as drive signals in the U, V and W phase paths for the coils and may be obtained by measuring voltages across the shunt resistors 20 through lines 24, 26, 28 for coils U, V, and W, respectively, of the motor 12. The noted shunt currents and voltage are just examples, and other current and voltage measurements associated with coil currents may be used. The measured voltages are directed to an ADC circuit 21 for transformation to appropriate current measurements that are then digitized for use as inputs for the controller 22 as noted herein. In one embodiment of the invention, as illustrated in the Figures, a Clarke transformation circuit 30 may be used to convert the time domain signals 24, 26, 28 into an alpha/beta representation or frame, as is known in the field of motor control. A Park transformation circuit may then convert the two components in the alpha/beta frame to an orthogonal rotating reference frame (dq). Implementing these two transforms in a consecutive manner simplifies computations by converting AC current and voltage waveform into DC signals as known to a person of ordinary skill in the art of motor control. Furthermore, the control circuit 22 uses table values from a sector duration table in accordance with the invention as discussed herein for providing more accurate control.

Specifically, the invention uses stored table values from a sector duration table for the motor to determine the control to be provided to the motor associated with each sector. The stored values are reflective of each unique motor operation and sensor placement for a particular motor and are then used to obtain additional key pieces of information for motor control, including the angle that the motor needs to be interpolated over for control and the time for the interpolation for a particular sector. Using those formulas, the controller can accurately track the rotor's angle within the sector and consequently apply the proper voltages to the motor coils to create a magnetic field that is at 90 degrees or orthogonal to the rotor's field.

Motor 12 as shown in FIG. 1 incorporates a plurality of Hall-effect sensors for providing sensor feedback signals 40 illustrated as Hu, Hv, Hw that are fed to an angle estimation circuit 42 for calculating the rotor angle 44 of the motor 12 according to known methods. That is, in the present example as discussed herein, 3 sensors are used. The rotor angle output 44 is provided to the Park transformation circuit 32 and can be used by circuit 46 for determining rotor speed 48 in accordance with known methods. The rotor speed input 48 is also used by the field oriented controller 22 for providing the motor control signals 23 to the drive circuit. As illustrated, the control signals 23 will operate the on/off cycles of the various banks of upper and lower transistors 16, 18 of the drive circuit 14 to provide the current drive signals 17 for the coils, indicated at U, V, W, as is conventional for the coils of the motor 12 for proper motor commutation.

When using three Hall-effect sensors, the output in the form of sensor bits provides 3 separate signal bits that may result in 8 possible bit combinations. However, for the purposes of defining 6 sectors reflective of a single motor rotation, motor manufacturers usually pick such signal polarities that exclude the numbers 0 and 7 from the possible combinations. This results in a feedback signal from the Hall-effect sensors that represents the numbers 1 through 6 and sectors 0 and 7 are deemed invalid and representative of disconnected or failed feedback circuitry. The described methodology and invention can be applied to any arrangement of Hall-effect sensors and their signal polarities; however, we will concentrate on demonstrating the approach by using the widely used method of tracking sectors 1-6 with 0 and 7 being considered invalid.

When the rotor of a motor spins, the various pole pairs or PP will engage each of the sensors and the feedback signals from the sensors will change states in a certain pattern in the motor as the poles pass the sensors. For example, based on the sensor values, that pattern can be interpreted as the particular sector that the rotor lies in and may change in the following manner: 1, 3, 2, 6, 4, 5 for a single electrical rotation. Then the pattern repeats itself for each successive electrical rotation. This provides the known 6-step commutation method, where for every sector, there are two specific motor coils that get energized in order for the motor to produce the desired torque and continue spinning in the same direction at a desired speed. The coils are thus treated uniquely as the rotor rotates through each of the sectors based on the readings received from the Hall-effect sensors. The sensors, through the changes of their state, provide a duration value as to how long the motor was in the previous sector. That is, each sensor state transition as noted by the Hall-effect sensor outputs indicates that the motor has completed time in the previous sector or last sector and is entering the current or new sector.

Figure 2:
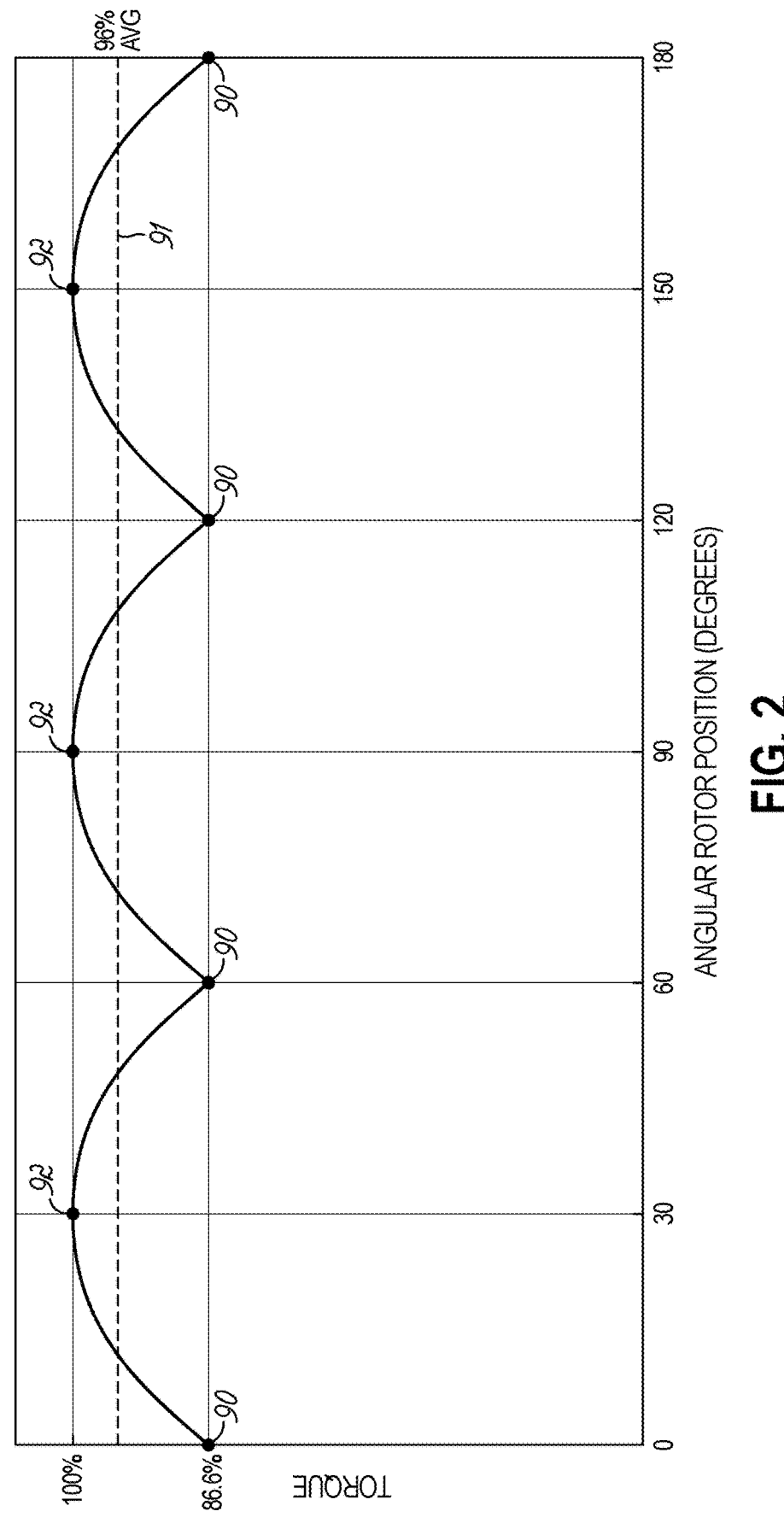
FIG. 2 is signal diagram of torque percentage as measured based on the angular rotation of the rotor element.

Motors that incorporate three Hall-effect sensors positioned at 120 degrees positioning in the motor will generally have a torque ripple because of the lack of resolution and positioning that is associated with using such sensors versus what may be achieved with a more expensive encoder. Hall-effect sensors provide a relatively inexpensive ability to achieve the desired motor commutation with good efficiency. FIG. 2 illustrates a typical torque ripple scenario, wherein maximum torque may be achieved at certain peak points 92 associated with the angular rotor position. However, between certain positions, the torque may decrease to lower values 90, such as around 86.6% of the maximum or 100% torque. As illustrated in FIG. 2, this produces a certain ripple wherein a generally acceptable torque efficiency of 96% average may be achieved as illustrated by line 91. One benefit of the present invention is that it provides the desired resolution of a more expensive encoder while still using Hall-effect sensors. The invention relies upon the movement of the motor to populate a table with sector ratio values as discussed herein. The present invention thus provides a reduced torque ripple, greater efficiency, and low noise while still avoiding the cost associated with expensive digital encoders.

Figure 3:
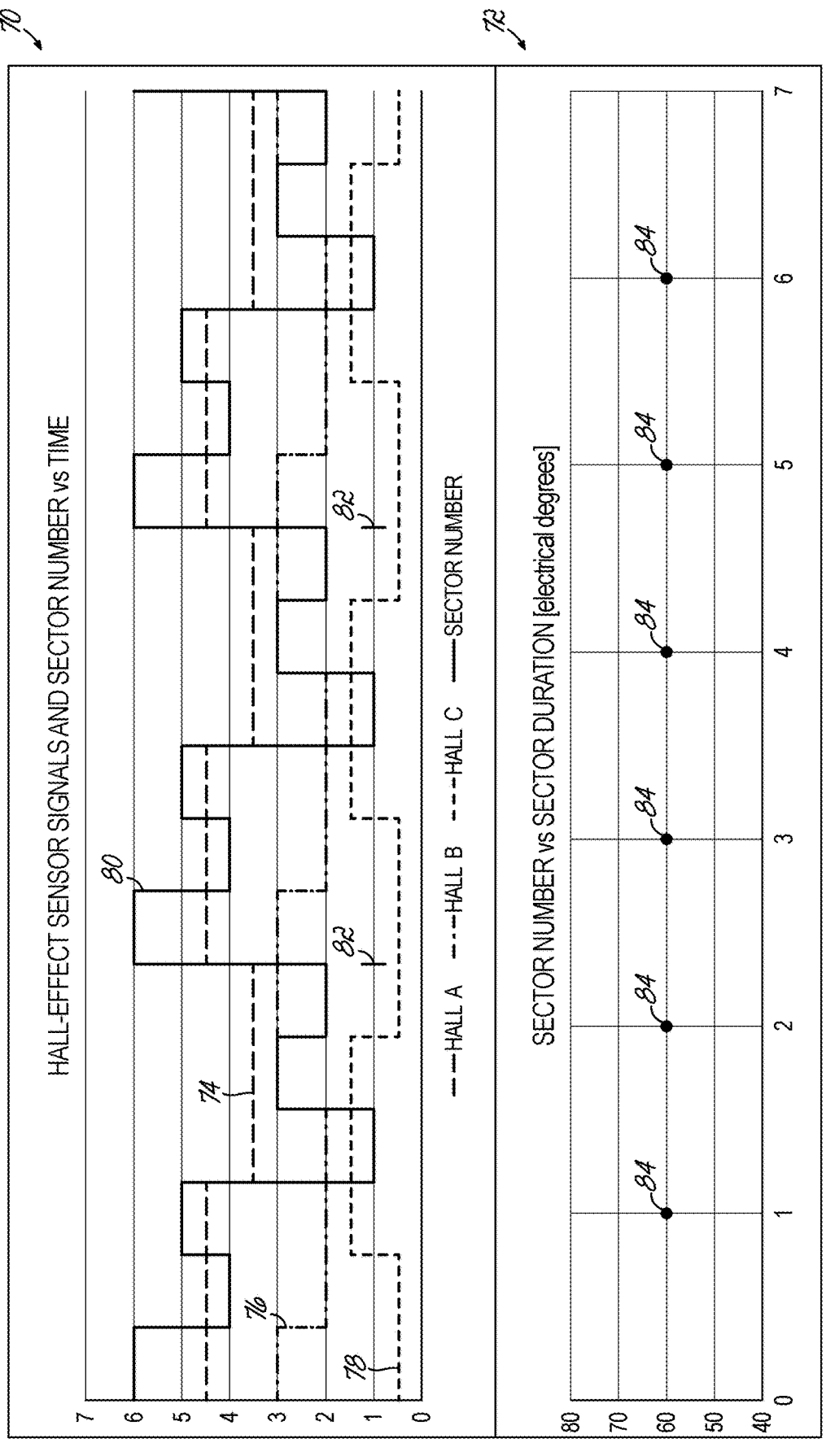
FIG. 3 is signal diagram reflective of a Hall-effect sensor signals over time for defining motor sectors and sector durations for a rotation of a rotor of an ideal motor.

The invention as described herein is applicable with six-step, sinusoidal, space-vector, or any other commutation technique that extracts information from the Hall-effect sensor signals. In an ideal three pole pair (PP) permanent magnet synchronous motor, often referred to as a brushless DC motor, each pole of the pole pairs (3PP=6 poles) will pass the various Hall-effect sensors (3 sensors) and so there will be a total of 18 unique sections formed by repeating the noted six sections. That is, with the three sensors, in one rotation of the rotor, the sensors will go through the various six sector patterns a total of three times, one for each pole pair. FIG. 3 shows the feed signals of such a three pole pair motor. The signal diagram 70 represents one full mechanical rotation of the rotor. A motor having three pole pairs (3PP) will have six magnetic poles for triggering each of the three sensors. Therefore, every Hall-effect sensor signal, shown in diagram 70 as Hall A 74 and Hall B 76 and Hall C 78 goes through three electrical cycles (a cycle corresponding to a pole pair) for every mechanical revolution of the rotor since every mechanical revolution means a revolution of all three pole pairs.

The signal trace 80 in the diagram 70 reflects the combination of the three sensor signals for each electrical cycle and interprets them as a sector number. The formula used in this example is: Sector=$A*(2^2)+B*(2^1)+C*(2^0)$ or simply mapping the A, B and C signals to the bits 2, 1, and 0, respectively, of the Sector number. As is evident from the diagram 70 of FIG. 3, an ideal motor (with three pole pairs) will go through a total of 18 individual sectors to complete one mechanical revolution of the rotor. Those 18 sectors are illustrated as three repeated 6 sector portions as shown in signal trace 80 divided by points 82. As seen, a pattern of 6, 4, 5, 1, 3, 2 is repeated three times.

Assuming that the motor is rotating at a steady state velocity, the time duration that the motor spends in each sector will be the same as the time duration in every other sector. Each of the 6 sectors represents 60 electrical degrees and at steady state rotational velocity, the motor will spend precisely the same amount of time in every one of these six sectors. This phenomenon of the time duration that is spent in a particular sector is used to measure the motor's speed. The time duration in a specific sector and the specific sector is also used to predict the position of the rotor within that sector. Assuming an ideal motor, the controller 22 can very accurately calculate the speed of the motor by measuring the duration of time that the motor spends in a single sector of the rotation as defined by the Hall-effect sensors. The formula for motor velocity is:

$$V=60/t$$

where:
V is the speed of the motor in electrical degrees per second.
60 is the electrical angle that one sector covers (this will depend on the number of Hall-effect sensors and the motor arrangement)
t is the time that the motor spent in the last measured sector.

Furthermore, once the speed of the motor is known by the controller 22 with great accuracy for a particular sector, the control circuit can use that information to predict the rotor position within a particular sector. The position of the rotor in a sector is then used to provide proper energizing of the motor coils for proper torque. Specifically, the known rotor position and thus the respective known position of the rotor's magnetic flux in a sector allows sinusoidal and space-vector techniques and other motor control techniques to create a magnetic field that is precisely offset from the rotor angle and the rotor flux to provide an efficient generation of torque from the motor. Being able to finely control the orientation of the generated magnetic field with respect to the rotor's magnetic flux, allows the controller to minimize the torque ripple and to thereby increase the efficiency of the motor. Generally, such control techniques usually aim at keeping the stator field at 90 degrees (or some other precise degree angle) to the angle of the rotor's magnetic flux. In the past, achieving such precise field control was usually delegated to using more expensive encoders. This is because Hall-effect sensor feedback has traditionally been limited to providing the rotor's angle at the ideal 60 degree increments. The reason control techniques like sinusoidal or space-vector modulation are difficult to implement with Hall-effect sensor feedback are because motors are never ideal and so some basic assumptions for an ideal motor do not allow for accurate control. The present invention provides greater resolution of rotor position within a sector than is achieved in typical Hall-effect sensor arrangements to provide reduced ripple, greater efficiency, and reduced noise.

More specifically, in the construction of a typical motor, the Hall-effect sensors can never be placed with zero error around the rotor. The various magnet elements and their position in the motor also suffer from the same placement error. Rotors can also be manufactured with sintered magnetic rings that get magnetized after sintering. The motor construction process also suffers from irregularities in the magnetic pole placements. The magnetizing equipment may be arbitrarily accurate, yet the material that gets magnetized will always exhibit some angular magnetization errors in magnitude.

Figure 4:
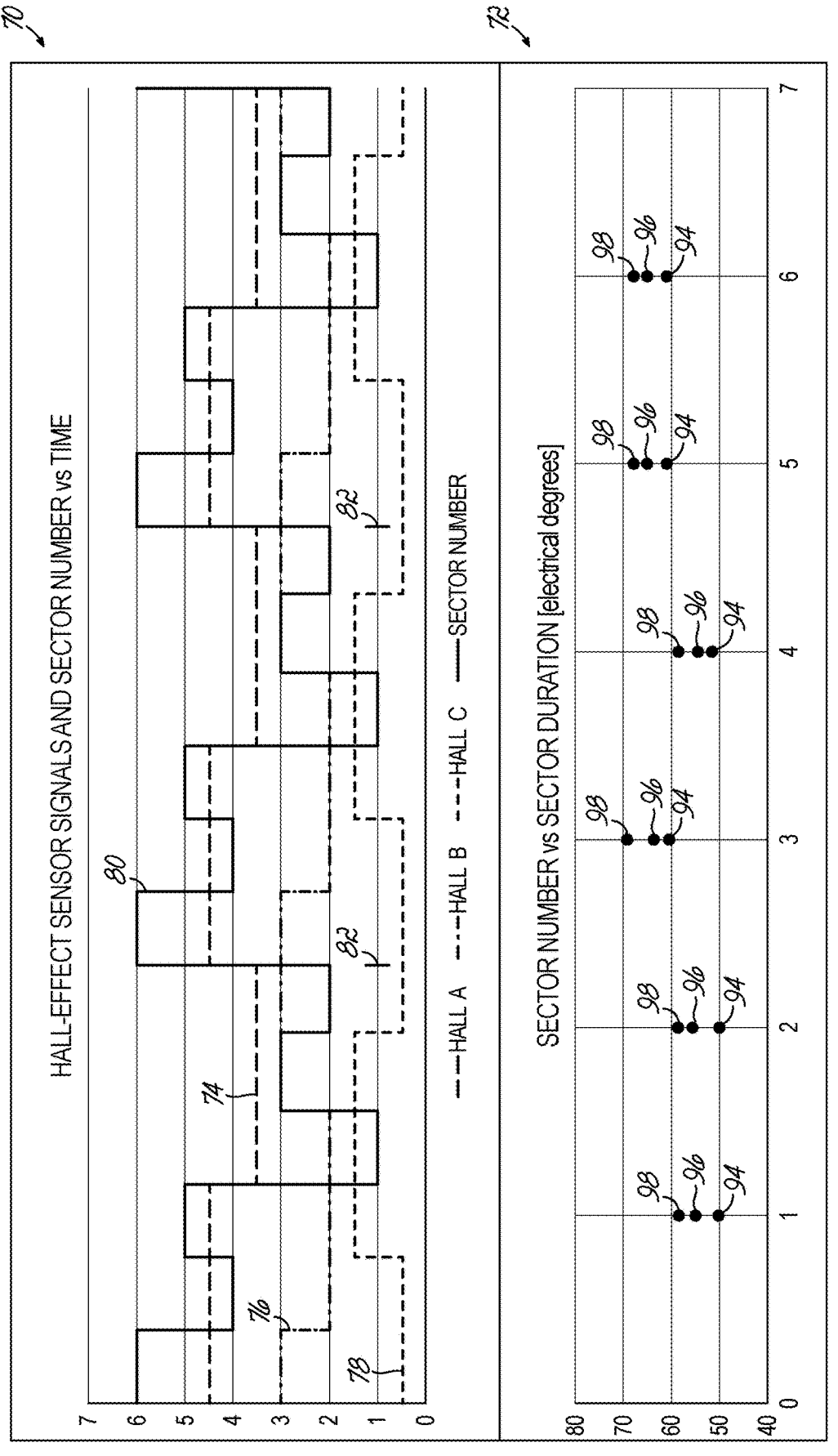
FIG. 4 is another signal diagram reflective of a Hall-effect sensor signals over time for defining motor sectors and sector durations for a rotation of a rotor of a non-ideal motor.

The graph 72 of FIG. 3 illustrates the various sectors and the duration of the sector in electrical degrees. As illustrated by points 84, each of the ideal sectors are at 60 electrical degrees in duration. However, with typical non-ideal motors, this is usually never the condition that is presented to the motor controller 22. Therefore, the invention addresses non-ideal conditions. FIG. 4 illustrates an example of a realistic motor where errors exist in the placement of the Hall-effect sensors. The errors are exaggerated to make the effect more visible. Even with perfectly spaced magnetic poles, if the Hall-effect sensors are not placed at precisely 120 electrical degrees in the motor, the sector durations no longer represent 60 electrical degrees. FIG. 4 illustrates the angular duration of the various sectors for the typical non-ideal motor. The errors in this example of FIG. 4 are reflective of sensor position errors. FIG. 4 shows the significant deviation of the sector durations per sector with points 94, 96, 98 in the graph 72 showing variations from the ideal 60 electrical degree ideal of graph 72 and points 84 in FIG. 3. This demonstrates how especially on high pole count motors, a small error in the physical placement of a Hall-effect sensor results in a large offset error in the sensor's signal and a specific variation of the duration of the various sectors from the ideal reflected in graph 70 and 72 of FIG. 3. Also, for the various sectors reflective of repeated sector numbers, the durations may vary as shown by the various sets of duration points 94, 96, 98 based on the pole pairs. That is, the duration of a sector as it relates to one of the pole pairs may be different than the duration of the same numbered sector as it relates to another pole pair.

As noted, FIG. 4 illustrates graphs for a more realistic, non-ideal motor, with errors in the pole placements. Such positional errors may result from errors in the physical placement of the sensors or placement of the discrete magnets of a stator or rotor element, or may reflect errors in the magnetization of the sintered magnet. As illustrated in FIG. 4, the various points 94, 96, 98 for each of the sectors further reflects that the duration can vary in the same sector numbers for each of the 18 individual sectors for a motor that incorporates three pole pairs because each of the pole pairs are different and therefore, the perceived sector duration will be different between those pole pairs.

Figure 5:
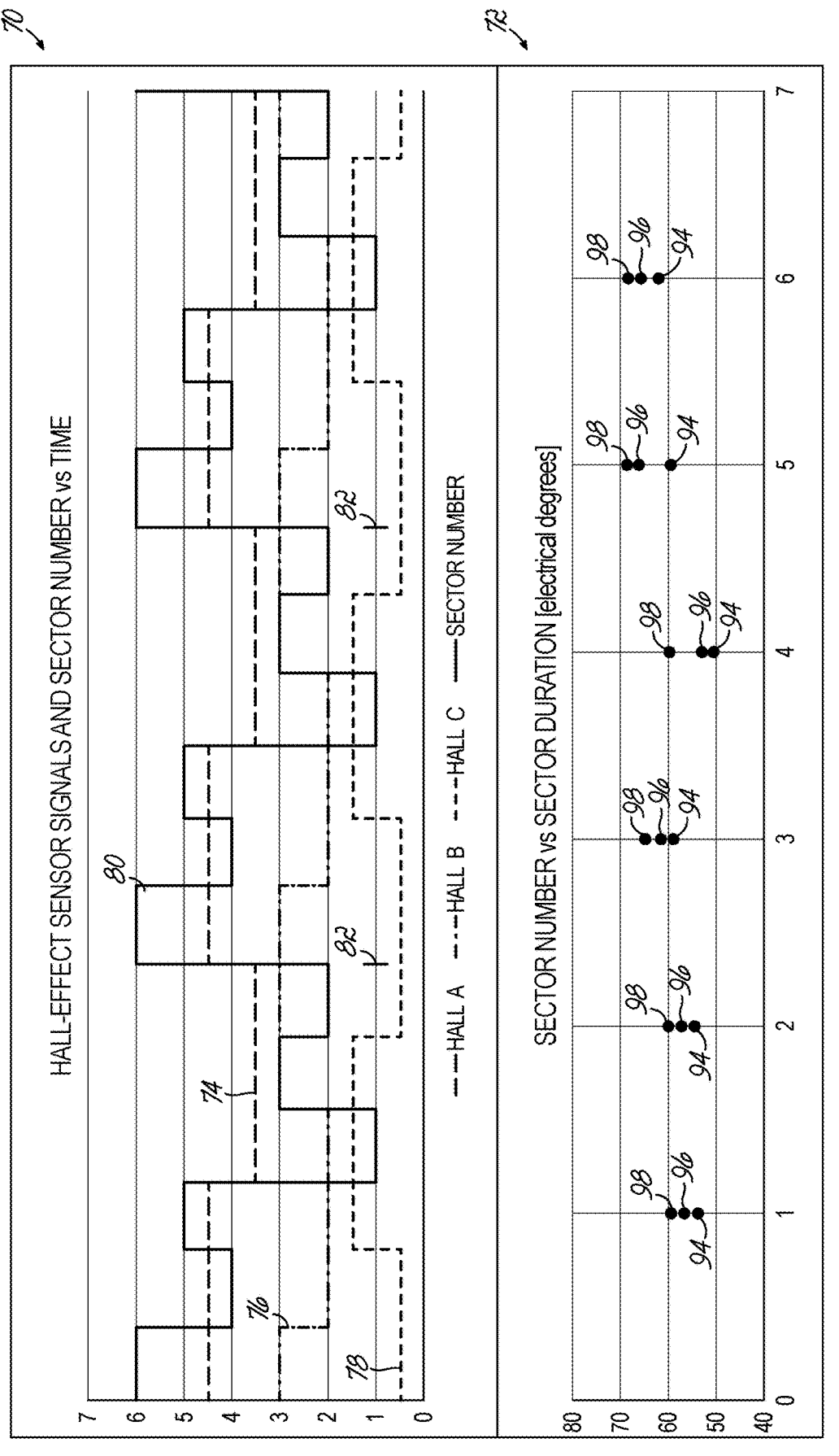
FIG. 5 is another signal diagram reflective of a Hall-effect sensor signals over time for defining motor sectors and sector durations for a rotation of a rotor of a non-ideal motor.

FIG. 5 also illustrates graphs 70, 72 for a more realistic motor where the positional errors are random, but limited to a +/−2 Electrical degrees in the various sectors. Since the illustrated example involves a three pole pair motor, the +/−2 degrees of positional error on the location of the magnetic poles or in the placement of the Hall-effect sensors represents a +/−0.666 (or ⅔) degrees of mechanical error. Modern manufacturing techniques can hold better tolerances than such an example, however what is demonstrated in the examples of FIGS. 4 and 5 has been observed in existing motors and therefore must be addressed. As shown in the signal graph 72 of FIG. 5, the points 94, 96, 98 illustrate that the duration of every sector is different and the variation in the example of FIG. 5 yields a duration variation as approximately 60 electrical degrees+/−15%.

Figure 6:
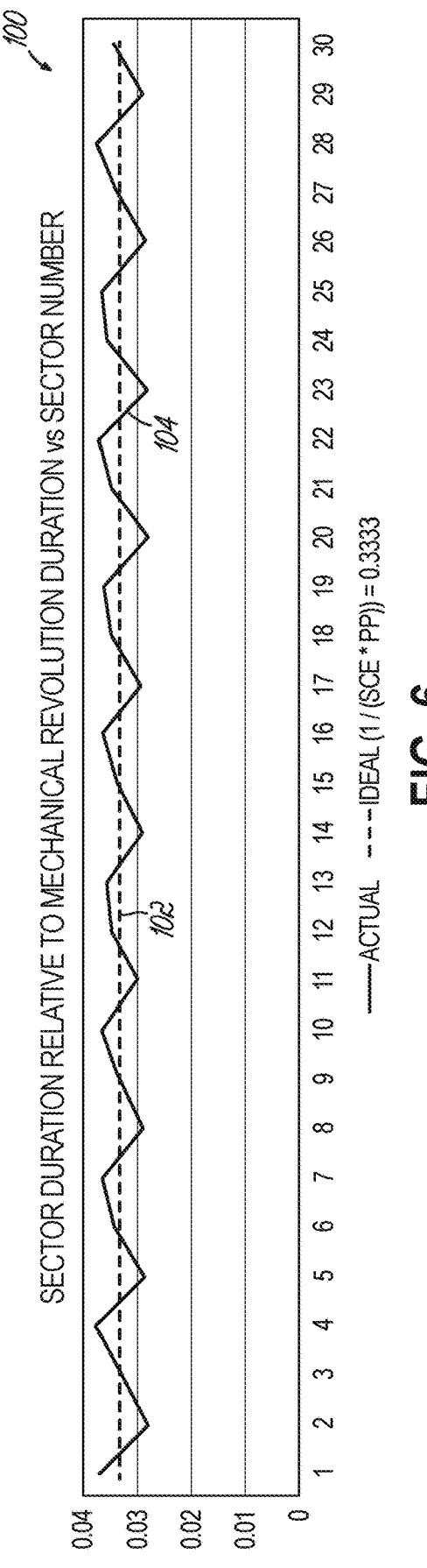
FIG. 6 is graph of sector durations for the successive sectors for a mechanical revolution of a motor versus an ideal sector duration for such a motor.

FIG. 6 represents data taken from an actual 5 pole-pair motor running at steady state in order to show the variations in durations of the different successive sectors from the standard sector duration for an ideal motor scenario. FIG. 6 shows sector duration ratios of a single sector duration to the total duration for a mechanical revolution (e.g., 1/30) in accordance with a feature of the invention. In graph 100 of FIG. 6, the trace 102 is reflective of the ideal motor scenario wherein the trace 104 reflects the actual sector duration for each different sector number as a ratio of the length time or duration in that sector versus the length of time or duration for all the sectors associated with the full mechanical duration for the motor. The data as shown in FIG. 6 covers one mechanical rotation of a motor. The sector duration as used in the present invention is expressed as the ratio:

Time duration_sector/Time duration_full mechanical rotation (all sectors).

SCE=sector count for an electrical resolution*PP=Pole Pairs of motor

In the example of a 5 pole pair motor (5PP), the total sector number is 6 sectors (SCE) times the 5 pole pairs=30. Therefore, for an ideal sector, the ratio for the duration of one sector to the duration for the total number of sectors would be reflected as 0.0333333 as shown in FIG. 6. However, the non-ideal motor yields non-ideal sector ratios due to the non-ideal durations of the various individual sectors for a particular pole pair of the motor. The mechanical inaccuracies of the motor are evident in FIG. 6, as every sector has a slightly different duration. One could expect similar amplitudes of torque ripple if those sector durations are directly used to estimate the motor speed.

With the inconsistencies of sector timing described above, measuring speed quickly and accurately is thus difficult. In various available motor control schemes, the control circuitry or controller has to employ some kind of filtering to minimize the +/−15% or so fluctuation in the sector duration timing from the ideal scenario, in order to get a stable speed signal. Moreover, if a controller is tuned for a particular motor and is configured to address that particular motor's timing jitter, the variation in other motors and their location or position errors and sector duration differences means that there is no guarantee that the next motor from a production line will exhibit the same levels of timing jitter. Accordingly, to handle a large number of different motor scenarios, developers and programmers addressing motor control need to tune their various filters and control schemes and controllers for the worst case motor conditions in order for the controllers to handle all of the various situations. This introduces a lot of delay and adversely influences other blocks of the controller, like the speed regulator. This is because any filtering applied to a signal in real-time causes a delay of the filtered signal. The more filtering that must be applied, the more delay that is introduced. As discussed herein, there is also a strange phenomenon that occurs as determined in the current invention, such that when dealing with timing jitter, more filtering does not always yield a cleaner filtered signal for use in speed control and commutation. Therefore, the present invention addresses the vagaries and differences in each unique motor and provides a unique control scheme and a way for predicting an accurate location of the rotor for getting a stable speed signal for the motor and for controlling the torque that is delivered.

The present invention improves on the efficient production of torque by providing a more accurate prediction of the sector duration for each individual sector and each of the pole pairs of the motor. That accurate information, in turn, provides for the more precise relationship between the generation of the flux between the rotor and stator elements. For example, if a controller uses sinusoidal or space-vector modulation techniques, such control techniques require the ability to accurately predict the duration of each sector of the motor in the motor's mechanical revolution cycle. With an accurate sector duration measurement for each unique sector, the controller can properly and precisely interpolate the location of the rotor and the rotor angle within a particular sector. As discussed herein, if the controller cannot use a precise prediction of how long every individual sector lasts in duration, its rotor angle location estimation for the various sectors will be in error. This location error then introduces torque ripple and torque inefficiency because the precise relationship between rotor flux and stator flux cannot be accurately maintained during motor control and commutation.

In accordance with one feature of the invention, the control methodology takes into account the timing jitter in the sector timing at steady state and takes advantage of discovered patterns in that timing jitter. The patterns allow for minimization of the amount of filtering that is required for accurate speed measurement and therefore provide for minimization of the delay in the filtered speed signal that is determined. The invention also allows a controller utilizing the control methods as described herein to accurately predict the current motor sector's duration for each unique sector, and therefore allow for accurate angle interpolation within the 60 degrees that the particular sector covers in the motor rotation. The present invention uses filtering of the speed signal based upon portions of or multiples of the number of electrical sectors (SCE) for the motor. Specifically, the speed signal is filtered based on multiples of SCE/2 or rather multiples of half of the electrical cycle. That is, a moving sum size or average for the speed measurement is determined by the control circuitry based upon a multiple of SCE/2. In that way, the control circuitry provides a fast acquisition of speed values and provides for a determination of desirable sector information in accordance with the invention.

In accordance with another feature of the invention, the controller 22 provides motor control using a ratio of a particular sector duration to the overall duration of a complete mechanical revolution of the motor to accurately predict the motor location in the control scheme. Using the feedback signals 40 from the Hall-effect sensors, the control circuitry, at the steady state velocity of motor rotation measures the duration of each individual sector for the SCE*PP number of sectors that are associated with a complete mechanical revolution of the motor. The control circuitry further measures the total duration of a complete mechanical revolution of the motor through the sensors. The control circuitry creates a sector table and then stores the ratio of each sector duration to the total duration of one complete mechanical cycle (motor revolution) in memory, such as memory in the field oriented control circuitry 22. The ratios for each individual sector are maintained in a created table each time the motor is operated. In accordance one embodiment of the invention, each time a motor is operated, a new table is created by the control circuitry. In that way, any ongoing changes in the motor that may affect sector dynamics are taken into account. Furthermore, if a motor is replaced and the control circuitry is operating a new motor with its own characteristics, the invention is able to adapt to such a scenario and to map that unique motor and its own unique sectors through the sector ratios. The table values are then used by the control circuitry for fast and accurate speed calculations without significant delay. More specifically, the delay is equal to the duration of one of the sectors. Furthermore, the sector duration values maintained by the control circuitry may be used to provide information for each current sector to allow the controller to know how long the motor will be in that specific current sector. The control circuitry then uses that sector duration information and the interpolates the rotor angle position at a specific time through a 60 degree (or other measured degree) sector. Because the sector information is reflective of the actual motor sector for the specific motor rather than assumed ideal duration, the angular position is more precise. Knowing that more precise angular position for the current sector, the control circuitry, such as the controller 22 then generates control signals for the various coils and rotates the magnetic flux such that the fluxes of the stator and rotor are maintained as close to a 90 degree angle as possible for maximum torque production, maximum torque efficiency and minimum torque ripple.

With respect to the filtering aspects of the present invention in the determination of motor speed and motor angle position, the duration of any consecutive number of sectors that reflect one or more full mechanical rotations of the motor will lower timing jitter. That is the measured duration of any (N*SCE*PP) number of sectors at steady state will have zero or close to zero timing jitter. However, because you have to complete at least one full mechanical revolution this presents a higher lag time for the controller 22 in acquiring a speed signal when the motor speed is changing. As the motor completes one mechanical revolution (SCE*PP), the process starts over and all construction errors, including magnetic errors and sensor placement errors, within the motor will repeat themselves. That is, the process is cyclical. For example, a 3 pole-pair (3PP) motor will go through SCE*PP=6*3=18 electrical sectors for every mechanical rotation. If the controller 22 were to measure the total duration of those 18 sectors, it would get a very low jitter measurement that can be used for a very accurate speed calculation. That same rationale applies for total duration measurements that are multiples of such full rotation measurements, where N>1. Generally, it is very beneficial to keep N at 1 in order to shorten the measurement time and minimize the delay that is introduced to the final duration value. It is also very beneficial to keep a moving sum or average of size SCE*PP as the various sector durations are determined. This allows for all past SCE*PP sector durations to be summed. Also, the filtered value of sector duration gets updated as every additional sector is measured.

At steady state speed conditions of the motor rotation, the total duration of the last SCE*PP sectors provides the cleanest speed signal possible as noted, but it also introduces the most amount of lag in providing a measurement when the actual speed of the motor changes. However, using a moving average of the duration of more or less than an SCE*PP number of sectors only increases the noise in the measurement.

In one embodiment of the invention, the speed measurement is determined from a duration less that the SCE×PP sectors. The duration that is associated with any consecutive SCE number of sectors provides a little more noise over the ideal N*SCE*PP measurement, but the measurement is provided with less delay in the actual measurement taken by the control circuitry. If a controller measures a moving sum or average of the durations of the last SCE number of sectors, it is in essence measuring the time duration for the last electrical cycle of the motor. Within one electrical cycle, the ripple of the individual sector durations balances out slightly to give a fairly good estimate of motor speed. However, because the electrical cycle durations are not exactly equal to each other within one mechanical revolution, the noise in this method of speed determination is still present. But it is significantly less that the noise found using the durations of the individual sectors.

In accordance with one aspect of the invention, it has been found that using a moving sum or average of less than SCE number of sectors increases the noise of the resulting measurement drastically. However, using a moving sum or average of more than SCE number of sectors also increases both noise and delay. The increase in noise and delay occurs until the number of samples reaches some multiple of SCE number of sectors and until it eventually reaches PP*SCE sectors. The present invention addresses the noise and delay issue by determining durations of certain specific numbers of sectors. More specifically, the invention determines durations of an SCE/2, SCE and PPxSCE number of sectors and uses those numbers of sectors as needed for determining motor speed.

In accordance with one aspect of the invention, the duration for an SCE/2 number of sectors is measured by the control circuitry and is used for determining the duration for a complete mechanical rotation of the motor. The measured duration of any consecutive half of the electrical cycle or SCE/2 number of sectors provides the smallest and therefore the least delayed measurement that is useful. This measurement represents only half of an electrical cycle for a full electrical cycle of SCE sectors, so the individual sector ripple does not balance out as well as with the other methods, such as using SCE sectors. However, using a determined duration of SCE/2 sectors (or a multiple thereof) for the moving sum or average still provides better ripple than the individual sector duration measurements. To that end, a controller can keep a moving sum or average of the last SCE/2 sector durations in order to have a speed estimate with minimal delay from the actual speed of the motor.

The present invention stays away from using a moving sum that deviates from such specific number of sectors and sector multiples, even though using durations for a greater number of sectors would seemingly be more accurate. Such a discovery in the invention is counter-intuitive to motor control because more filtering and input data used usually means less noise. However, the inventors have found that if the controller were to keep a moving sum or average different than the selected multiple of sectors, for example (SCE/2)+1 sectors then the resulting signal has more noise. Such a discovery in the invention is counter-intuitive to motor control because as noted more filtering usually means less noise. In accordance with a feature of the invention, when maintaining moving sums or averages for cyclic machines, such as a permanent magnet synchronous motor (PMSM) it is beneficial to set the sizes of those moving sums or averages to be some multiple of half of the sector count for a complete electrical cycle (SCE), or rather (SCE/2). That is, the moving sums or averages are set to the sizes that represent multiples of half of the sector count go a complete electrical cycle.

Figure 7:
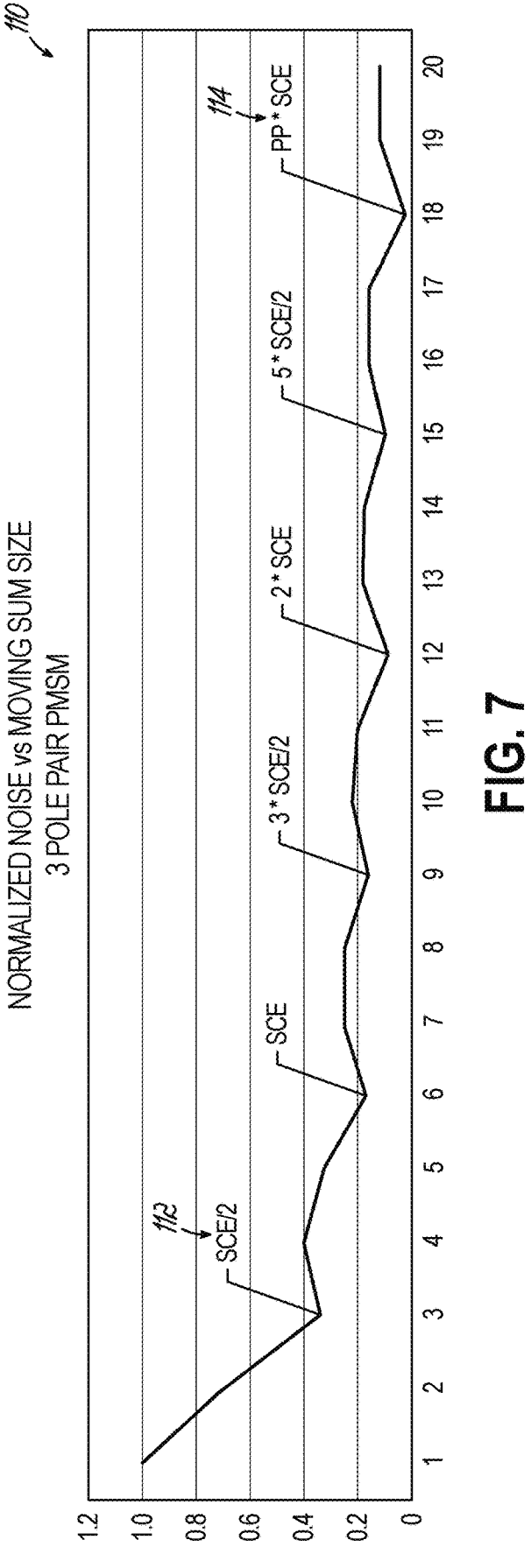
FIG. 7 is a graph of normalized noise versus the size of a running duration sum or average for calculating motor speed in a motor.

In accordance with that feature of the invention, FIG. 7 shows a graph 110 of normalized noise versus the size of a running sum or average for calculating motor speed in accordance with the invention. Referring to the graph of the normalized noise trace in the graph 110, we would see minimums at the specific locations of SCE/2 sectors as shown in point 112, and minimums as well at locations of other multiples of SCE/2 sectors, such as SCE, N*SCE sectors. The deepest minimum is illustrated at a full mechanical rotation of P*SCE as shown in point 114. The noise in the chart is normalized to the worst single sector noise. The Y axis values in the graph 110 are not definitive.

They simply illustrate the principle of where the minimums occur using the present invention. The above-described effects are not limited to moving sums and averages. They can be implemented with other filter architectures. We are using the moving sum as a clean and simple approach, but the invention is not limited to using moving sums and averages.

Generally, a motor controller and control circuitry has no prior knowledge of the Hall-effect sensor placement errors and the magnetic pole location errors that are present in a particular motor that is being controlled. Therefore, the controller cannot predict the variation of sector durations in the motor from an ideal motor configuration. Therefore, as noted, past control schemes just assume ideal situations or make assumptions not based on the real configuration of any particular unique motor. In accordance with an aspect of the present invention, the various relationships regarding speed measurements for minimizing noise and providing minimal delay are used to determine variations in the sector durations in order to provide faster and more accurate speed calculations and more accurate and efficient torque.

Specifically, when a motor is first operated, the circuitry, such as controller 22 in one embodiment evaluates durations of the sectors and keeps a running sum of the duration of SCE/2 sectors, SCE sectors and PP×SCE sectors. With those values, the motor can calculate early speed figures. For example, if you only have SCE sectors for an electrical rotation, you can multiply by the PP number of poles and use that information for the duration of the full mechanical rotation for a motor. Then, when the controller identifies that the motor is running at a steady state speed, the controller measures the individual durations for the various sectors. The controller then stores the information regarding all of the determined sector durations. In one embodiment of the invention, the controller determines a ratio of each particular sector duration to the total time duration it takes for the motor to complete one mechanical revolution. The ratio data is stored for each motor sector, such as in the controller memory or other memory. The data may be stored in a table, for example, for each unique sector. The total time for a complete mechanical revolution is reflective of all the different sector durations associated with the motor sectors defined by the Hall-effect sensors and the various pole pairs (PP) of the motor. That is, the total number of sectors to evaluate and store is (PP*SCE).

When the controller 22 is initially powered, it stores ideal sector values for the sectors of the motor. An example of such evaluation using an ideal 3 pole pair (PP) motor will result in a total of 18 sectors (3×6 sectors), with each ideal sector having a duration ratio of $\frac{1}{18}^{th}$ or 0.055555 . . . or 0.0(5). Specifically, in an ideal scenario and motor, every measured sector duration will last the same length of time and will be exactly 1/(PP*SCE) or $\frac{1}{18}$-th of the total duration of one mechanical revolution of the motor. As noted below, the ideal values can initially be used to populate the table until refined.

Figure 11:
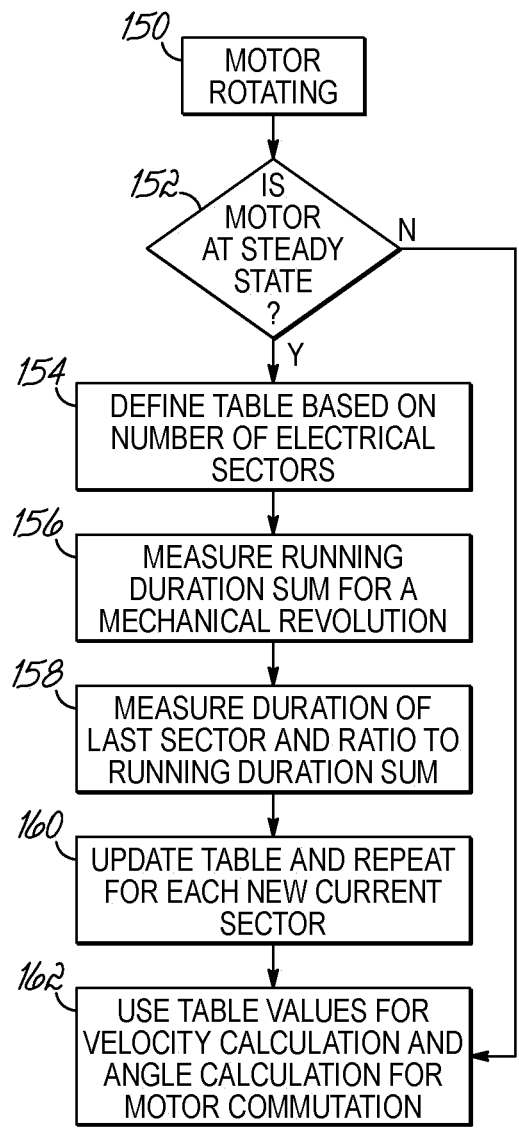
FIG. 11 is a flow diagram of the evaluation of the individual sector conditions and create of the ratio table in accordance with the invention.

FIG. 11 illustrates a controller flow in accordance with an embodiment of the invention. The controller flow is executed by the controller 22 and processor and memory elements therein as conventional for control and commutation of the motor. The control circuitry for implementing the invention can take any number of configurations, and so the configuration as disclosed is not limiting to the invention. Although a controller element 22 having processing and memory functionality may implement various functional steps of the invention, such function may be distributed in other elements of the processing circuitry. Once a motor is running as in block 150 a determination is made by the controller to see the motor is running at a steady state speed. Block 152. If it is not, the initial table values reflective of an ideal motor are used for the purposes of speed and angle determination. When controller 22 powers up for operation of the motor, the controller populates a table with the theoretical values and ratios for an ideal motor. The ideal table values can and are used for motor control, at least initially. That is, for example, ideal 60 degree sectors may be assumed. The pre-populated table is used for the interpolation of the rotor angle of the motor as discussed herein. However, as noted, the ideal values that are used for the calculations are for a non-ideal motor, and so those initial values will produce torque ripple and extra noise. As time goes on, however, the table is refined in accordance with the invention. If the motor is at steady state, the table is updated through sector duration measurements that determine the actual or more precise sector duration and characteristics for each unique sector. To that end, the table for population and updating is defined for the total number of (PP×SCE) sectors, such as a total of 18 sectors for a 3PP motor. Block 154. The running duration sum for a mechanical revolution is measured. Such a sum will generally be available for the running motor, but the mechanical revolution duration reflective of steady state conditions is measured and determined for the motor. Block 156. Then for each last sector or previous sector that a rotor was in, a duration time is measured. That measured most recently completed sector duration is ratioed to the running duration sum for a full mechanical revolution duration. Block 158. That ratio is updated in the table of the controller 22. In one embodiment, the table value is overwritten with the new measured and determined value. In another embodiment, the newly determined value is averaged with the old or current value and the table is updated with the value as an average of the new and old values. Still further, the updating may be even more gradual. In another embodiment, the existing or current values in the table are updated or modified by a scaled version of the difference between the newly measured value and the old/current table value. That is, you store the old table value as varied by the addition of some scaled version of the difference (new value–old/current value) for the table.

In any case, the table is updated with the last sector duration ratio value in order to make the table reflect a fingerprint of the characteristics of the particular motor. This is repeated for each successive sector measured during steady state movement of the motor. Block 160. The updated table values of the sector duration ratios are then available for use in calculating motor velocity and angles of the rotor in a sector for use in motor commutation. Block 162. The angle interpolation and other control parameters that use the more accurate values of the refined table are more accurate as well, causing the torque ripple and noise to be minimized for a motor operated using the invention.

The table is only updated at steady state but the values of the table are used all of the time, even as the speed of the motor changes. As time progresses, the table values will be refined during times of steady state movement/speed of the motor.

The table and the sector duration ratio values are monitored in accordance with the invention by the controller 22 to determine how significantly the values change in the update cycles for each sector. That is, in accordance with one aspect of the invention, the controller may use the ideal values for a period of time until the more accurate values are established in the table. The controller may use certain ideal values (i.e., assuming ideal sector durations) and use SCE/2 or SCE sector averages to determine the full rotational duration, velocity and angles until the table has been determined to have good stable values and ratios for each sector. A particular variation threshold may be used by the controller to designate the measured table values as suitable to be used in the calculations. For example, if the table values are only varying slightly (e.g., by 1-2% in the update) and the variation meets the variation threshold then they may be designated as acceptable and then the controller may start using the table values for speed and angle determination. Other variation thresholds may be used to monitor if the table duration ratios have settled to an accurate state.

Figure 8:
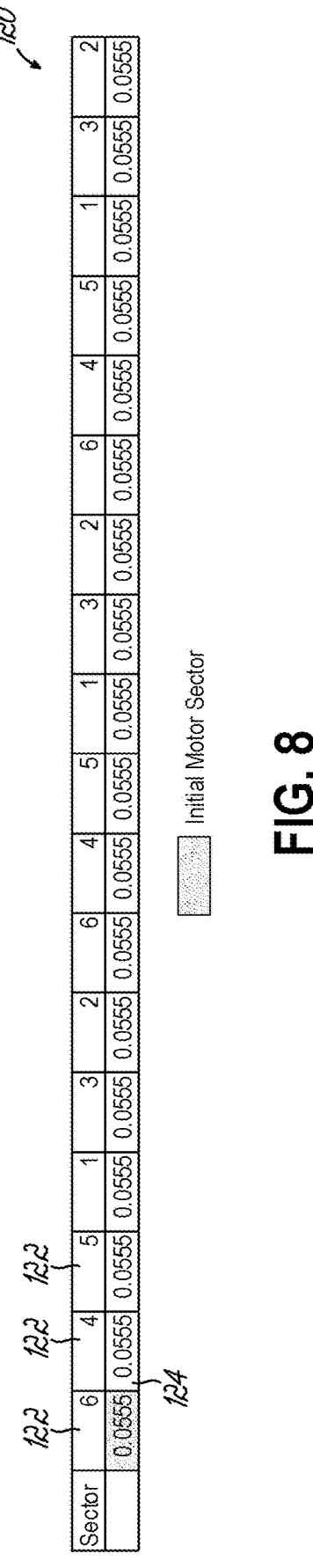
FIG. 8 is a table of sector duration values for an ideal motor.

As noted herein, an example of such evaluation using an ideal 3PP motor will result in a total of 18 measured sectors (3×6 sectors), with each ideal sector having a duration ratio of $1/18^{th}$ or 0.055555 . . . or 0.0(5). That is, every sector will last the same length of time and will be exactly $1/18$-th of the total duration of one mechanical revolution. An ideal table might be used for the purposes of motor control until a more accurate measured sector table can be provided in accordance with the invention. In determining the information for a typical and non-ideal motor, the controller 22 establishes a table (Block 154) that may be preset to the ideal values for each sector on initialization of the controller process. FIG. 8 illustrates an embodiment of a table 120 that includes a plurality of sectors 122 with each duration ratio entry reflective of a ratio value 124 for the particular sector duration versus the total duration for a single mechanical rotation of the motor. FIG. 8 shows the ideal table values 124 for an 18 sector motor scenario. In accordance with the invention, as the real sector durations are determined, the table values 124 are updated by the controller. As noted above, the various sector designations, for a 3 pole pair (PP) motor, will repeat every 6 sectors. As is shown in FIG. 8 the actual sectors are designated as 6, 4, 5, 1, 3, 2, which then are repeated for each pole pair of the motor. As such, this will allow each individual sector to have its own duration value based on a unique pole pair location, even though from a designation of the particular electrical sector, they may share the same designation. That is, each of the repeated sectors will have different values reflecting the unique sector for a particular pole pair in the motor. There are a total of 18 sectors defined for a six sector motor and 3 pole pairs.

Figure 9:
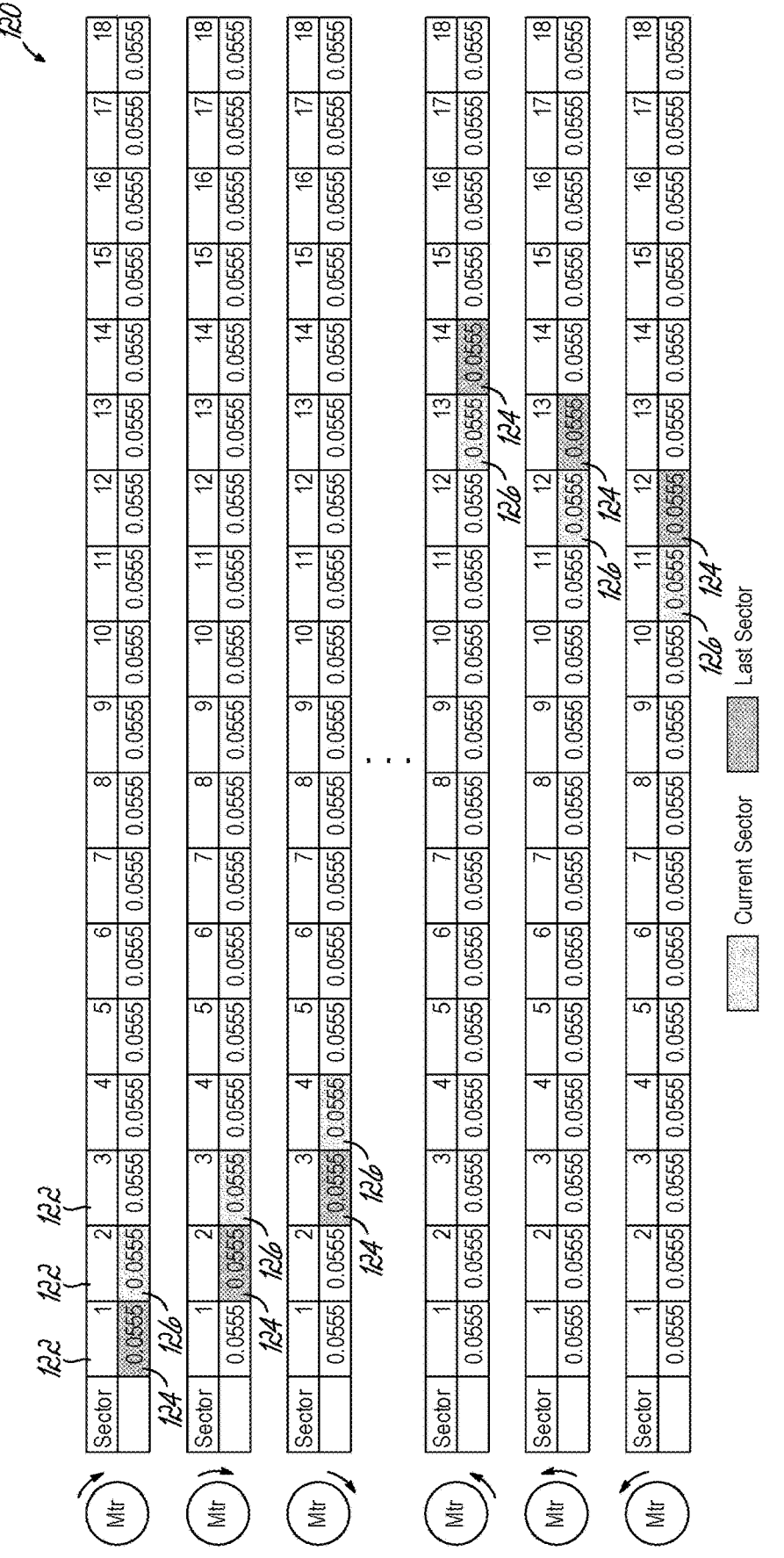
FIG. 9 is a plurality of tables of sector duration values for in accordance with the invention showing the update of values in the progression through the tables as the motor progresses in clockwise and counterclockwise rotation.
Figure 10:
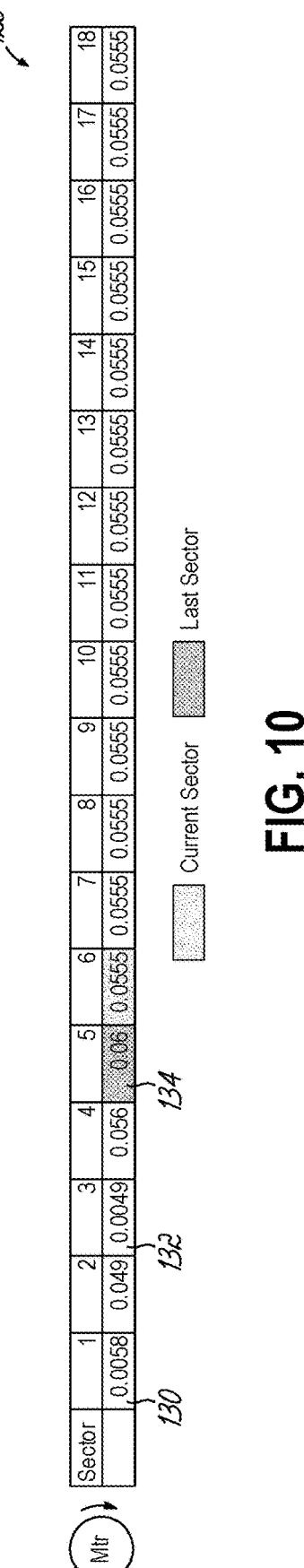
FIG. 10 is a table of determined sector duration values for a non-ideal motor determined in accordance with the invention showing different values in various sectors over the complete rotation of a motor.

As the motor moves, the pole pairs will pass through the various sectors and can measure the duration in each sector and can update the table 120 one sector duration value at a time either forward or backward, depending on the direction of travel of the motor. FIG. 9 illustrates the sector update progress through the table 120 both in a clockwise direction on top wherein the last sector 124 is to the left of the current sector 126 and in a counterclockwise direction where the table last sector 124 is to the right of the current sector 126. As noted herein, a sector can have a numerical representation (ex. 6, 4, 5, 1, 3, 2), and in a multi-pole-pair motor, there are PP individual sectors that will have the same numerical representation. In the table 120 of FIG. 9, the various sectors are designated with a continuous nonrepeating sequence 1-18, but as noted with FIGS. 3-5, 8 the sectors could generally have the same sector designation but different durations. The data in table 120 of FIG. 10 illustrates various sector durations, indicated as ratios, after measurement and processing in accordance with the invention. The various sectors indicated as 130, 132, 134 are reflective of sectors that have different durations, all of which vary from the original ideal values of 0.0555 as noted in FIGS. 8 and 9. The controller differentiates between the various different durations and respective electrical sectors because the table 120 stores the duration values with a total size of (SCE*PP), or 18 in the discussed example. The table 120 of FIG. 10 has sector values that may be used for fast speed determinations for the motor and for angular determination of the position of the rotor for torque control in accordance with the invention.

In accordance with one feature of the invention, as the motor passes through moments of steady state, the controller 22 of the invention can evaluate the duration of the various sectors and determine the ratios. The controller then refines the data for the individual sectors in the table 120. At steady state, the controller can use an SCE*PP moving duration sum of a full rotation for a very accurate speed representation, and then can calculate the ratio of the duration of the last measured sector to this moving full rotation sum. This provides an updated value for the last sector that the controller stores in the table.

In accordance with a feature of the invention, the stored table value can be used for speed calculations and other calculations, even when the motor is not at steady state. For example, the previously determined and stored table values may be used even during acceleration or deceleration of the motor. The controller maintains a table of SCE*PP values where every value represents one of the SCE*PP sectors that the motor can be in. As the motor operates, the controller further refines those values to better reflect the individual sector durations. As described herein, one of several update methods may be used. Eventually, the table will hold values that reflect the actual and more accurate durations of the individual sectors. In accordance with one aspect of the invention, it is beneficial to store the sector durations as a ratio of their actual time duration to the time duration of one mechanical rotation. When stored as such a ratio, the controller can use the data for very fast and accurate speed measurements, with zero delay.

More specifically, since the duration of the last sector was also measured as a time interval, and the controller has already calculated and stored the ratio of the sector's duration to the duration of one mechanical revolution, the controller can rapidly determine speed using the table values as a calculation of:

$$V=R\_Is/T\_Is$$

Where:
V is the mechanical frequency or speed of the motor (in rotations per second).
T_Is is the time the motor spent in the last sector.
R_Is is the value from the sector duration table that corresponds to the last sector the motor was in.

The result of the speed calculation for motor control using the methodology of the invention is very accurate and fast and with very little noise because the table values compensate for the inaccuracies in the motor and the differences in the sector durations between sectors. The measured duration table values are available immediately. The result also has close to zero delay because the speed calculation is based on a measurement that was just previously completed. That is, the motor just finished passing through the last sector that is used in the calculation.

Initially, on motor power up, the sector durations table 120 will hold the ideal values (See FIG. 8) and the resulting calculated speed signal will be noisy. As the controller 22 controls and spins the motor, it refines the values in the table until the table values represent the true motor sector durations for each sector of the motor as reflected for example in table 120 of FIG. 10. This refinement takes into account all the unique sectors for the motor and all the unique and various pole pairs in the motor in combination with the unique sectors. Once the sector durations are calculated and the table is updated, the speed error is practically zero because all of the Hall-effect sensor placement errors and magnetic pole errors are compensated for by the table values in each sector that reflect the unique pole pairs and unique sectors.

Furthermore, once the table values have been refined by the controller in accordance with the invention, the resulting speed is valid even if the motor's speed is rapidly changing. This allows the controller 22 to very quickly react to load and speed changes on the motor. Such a quick reaction by the controller is very useful in high performance motor control in various control applications, such as in servos, robots, actuators, etc.

Another benefit of the individual sector evaluation and the sector duration table of the invention is that once it has been refined to represent the actual sector durations of the motor, it provides data for the current sector that the motor is in. As the motor leaves one sector and enters another following sector, the controller needs to be able to predict how long the motor will then spend in that next, current sector. The controller needs this information so that it can accurately interpolate the rotor angle throughout the generally 60 degree sector and thereby control the motor flux conditions, in such a way that it maintains, as close as possible, the flux of the stator at 90 degrees with respect to the rotor.

More specifically, in one embodiment, the controller 22 of the invention accurately interpolates the rotor angle of the motor throughout the generally 60 degree sector using the duration ratio values of the table. Knowing that angle, the controller rotates the stator's magnetic flux in such as way as to maintain, as close as possible, a 90 degree angle to the rotor's magnetic flux, for maximum torque production, maximum efficiency and minimum torque ripple. The controller 22 uses the table of sector values to provide accurate angular location information and speed information for any motor in order to provide precise torque control without the need for expensive encoders. Instead, the present invention provides improved control using conventional Hall-effect sensors while providing a level of precision normally requiring encoders.

To that end, the controller 22 first measures the accurate speed of the motor based on the last sector, as set forth herein. Then the controller 22 uses the stored duration ratio table value for the current sector it is entering to determine how long the motor will then spend in that current sector based on the motor speed or velocity determined from the previous or "last sector". Specifically, the controller determines that duration time that the motor will spend in the current sector as follows:

$$T\_cs=(T\_Is/R\_Is)*R\_cs$$

Where:
T_cs is the duration time the motor will spend in the current sector.
R_cs is the value from the sector duration table that corresponds to the current sector the motor just entered.

$$V=R\_Is/T\_Is$$

Generally, during a sector, an ideal motor would rotate a total of 60 degrees, but using the invention, a non-ideal motor will be found to rotate a different amount. In accordance with the invention, the table of stored sector ratio values may be used to evaluate the rotation angle span for a particular sector. The angle of the sector may also be determined. The electrical angle span for a particular sector of the motor might be determined by the following:

$$A=R\_cs*PP*360.$$

Where:
A is the actual sector electrical angle in degrees.
R_cs is the value from the sector duration table that corresponds to the current sector the motor just entered.
The information of the more accurate angular rotation in a particular sector, as well as the time that is spent in that current sector, as provided by the invention provides a more accurate control for providing the desired 90 angle for the stator and rotor flux orientation. The controller 22 now has two key pieces of information it uses for motor control. The angle it needs to interpolate over for a sector and the time for the interpolation as the motor progresses through the sector. Using the angle of the sector and time spent in the sector, the controller 22 can accurately track the rotor's angle in the sector and consequently apply the proper voltages to the various motor coils to create a magnetic field that is at a 90 degree orientation to the rotor's field. With the information of the invention knowing the accurate time in the current sector as well as the more accurate angle of the sector, the electrical field may be adjusted to obtain an orthogonal flux field as desired for efficient torque delivery in accordance with known motor control processes. In one embodiment of the invention the table information might be updated at 10-50 kHz for motor control.

The 90 degrees torque orientation noted herein is just an example for a PMSM motor operated without significant field weakening. Other motors might also be controlled using the invention and may operate under different conditions that may require more or less of an angle between the rotor and the generated magnetic field. The same principles would apply as discussed herein because the controller still has to generate a magnetic field at a certain angle relative to the rotor's angle using the features of the invention. For example, the invention herein might be used with an Interior Permanent Magnet Synchronous Motor, where the target angle may vary with load due to the reluctance of the rotor.

The routines executed by the controller 22 or other control circuitry to implement the embodiments of the invention, whether implemented as part of an operating system or a specific application, component, program, object, module or sequence of instructions executed by one or more devices/controllers and/or control systems/computing systems will be referred to herein as a "sequence of operations," a "program product," or, more simply, "program code." The program code run by the controller 22 or other control circuitry will typically comprise one or more instructions that are resident at various times in various memory and storage devices in a controller and/or computing system, and that, when read and executed by controllers and/or a computing system, cause that controller and/or computing system and control circuitry to perform the steps necessary to execute steps, elements, and/or blocks embodying the various aspects of the invention. The control circuitry has sufficient processing circuitry for evaluating and determining the speed of the motor and the duration of the motor in each sector the control signals, storing the sector duration values and ratios, and using the ratio values for proper position and torque control of the motor.

While the present invention has been illustrated by the description of the embodiments thereof, and while the embodiments have been described in considerable detail, it is not the intention of the applicant to restrict or in any way limit the scope of the appended claims to such detail.

Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A motor system comprising:
a motor including a rotor and a stator;
a plurality of sensors positioned in the motor for defining a plurality of electrical sectors of the motor through which the motor will rotate;
control circuitry for operating the motor and controlling the motor, the control circuitry configured for:
    determining if the motor is rotating at a steady state velocity;
    at the steady state velocity, using the sensors and measuring the duration that the motor spends rotating within each of the plurality of electrical sectors;
    using a plurality of the measured durations within electrical sectors and determining the duration of a complete mechanical rotation of the motor through all of the electrical sectors;
    determining a value of a ratio of the measured duration of the motor in a particular sector to the duration of the complete mechanical rotation of the motor;
    storing the determined ratio values of sector duration to complete mechanical rotation duration;
    controlling the motor using the determined sector ratio values.

2. The motor system of claim 1 wherein the control circuitry is further configured for determining the velocity at which the motor rotates using at least one of the determined sector ratio values.

3. The motor system of claim 1 wherein the control circuitry is further configured for determining the time the motor spends in a particular sector using at least one of the determined sector ratio values and using the determined time in the particular sector for controlling the motor.

4. The motor system of claim 1 wherein the control circuitry is further configured for determining an electrical angle of a particular electrical sector using at least one of the determined sector ratio values and using the determined electrical angle of the particular electrical sector for controlling the motor.

5. The motor system of claim 1 wherein the control circuitry is further configured for storing the determined sector ratio values in a table and updating current values in the table with newly determined values as the motor rotates at a steady state speed.

6. The motor system of claim 5 wherein the control circuitry is further configured for updating values in the table replacing a current value for an electrical sector with at least one of a newly determined value for that same sector, an average of the current value and a newly determined value, or the current value as modified by a scaled version of the difference between the newly measured value and the current value.

7. The motor system of claim 1 wherein the control circuitry is further configured for determining the duration of a complete mechanical rotation of the motor through all of the sectors using only a portion of a total number of electrical sectors of the motor.

8. The motor system of claim 7 wherein the motor has a total number SCE of electrical sectors of the motor, the control circuitry is further configured for using at least a multiple of SCE/2 sectors for determining the duration of a complete mechanical rotation of the motor through all of the sectors.

9. The motor system of claim 5 wherein the control circuitry is further configured for initially controlling the motor using the ideal sector ratio values, and monitoring the variation between the current table values and the newly determined values and controlling the motor using the determined sector ratio values when the variation meets a variation threshold.

10. A controller for controlling a motor including a rotor, a stator and a plurality of sensors positioned in the motor for defining a plurality of electrical sectors of the motor through which the motor will rotate;
the controller configured for:
    determining if a motor is rotating at a steady state velocity;
    at the steady state velocity, using sensors of the motor and measuring the duration that the motor spends rotating within each of the plurality of electrical sectors;
    using a plurality of the measured durations within electrical sectors and determining the duration of a complete mechanical rotation of the motor through all of the electrical sectors;
    determining a value of a ratio of the measured duration of the motor in a particular sector to the duration of the complete mechanical rotation of the motor;
    storing the determined ratio values of sector duration to complete mechanical rotation duration;
    controlling the motor using the determined sector ratio values.

11. The controller of claim 10 further configured for determining the velocity at which the motor rotates using at least one of the determined sector ratio values.

12. The controller of claim 10 further configured for determining the time the motor spends in a particular sector using at least one of the determined sector ratio values and using the determined time in the particular sector for controlling the motor.

13. The controller of claim 10 configured for determining an electrical angle of a particular electrical sector using at least one of the determined sector ratio values and using the determined electrical angle of the particular electrical sector for controlling the motor.

14. The controller of claim 10 configured for storing the determined sector ratio values in a table and updating current values in the table with newly determined values as the motor rotates at a steady state speed.

15. The controller of claim 14 wherein the control circuitry is further configured for updating values in the table replacing a current value for an electrical sector with at least one of a newly determined value for that same sector, an average of the current value and a newly determined value, or the current value as modified by a scaled version of the difference between the newly measured value and the current value.

16. The controller of claim 10 further configured for determining the duration of a complete mechanical rotation of the motor through all of the electrical sectors using only a portion of a total number of electrical sectors of the motor.

17. The controller of claim 16 wherein the motor has a total number SCE of electrical sectors of the motor, the controller further configured for using at least a multiple of SCE/2 sectors for determining the duration of a complete mechanical rotation of the motor through all of the electrical sectors.

18. The controller of claim 14 further configured for initially controlling the motor using the ideal sector ratio values, and monitoring the variation between the current table values and the newly determined values and controlling the motor using the determined sector ratio values when the variation meets a variation threshold.

\* \* \* \* \*